United States Patent
Murayama et al.

(10) Patent No.: US 6,376,083 B1
(45) Date of Patent: *Apr. 23, 2002

(54) MAGNETIC RECORDING MEDIUM

(75) Inventors: Yuichiro Murayama; Masaki Satake; Hiroshi Hashimoto; Tsutomu Okita, all of Odawara (JP)

(73) Assignee: Fuji Photo Film, Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/532,976

(22) Filed: Sep. 22, 1995

(30) Foreign Application Priority Data

Sep. 22, 1994 (JP) .............................................. 6-228178

(51) Int. Cl.⁷ ............................................... G11B 5/702
(52) U.S. Cl. .............................. 428/425.9; 428/694 BU; 428/694 BL; 428/694 BS; 428/900
(58) Field of Search ....................... 428/425.9, 694 BU, 428/694 BL, 694 BS, 900

(56) References Cited

U.S. PATENT DOCUMENTS

| 4,152,485 A | 5/1979 | Mizamura et al. | ......... 428/425 |
|---|---|---|---|
| 4,637,959 A | * 1/1987 | Ninomiya et al. | ........ 428/425.9 |
| 4,643,949 A | 2/1987 | Kolycheck et al. | ......... 428/425 |
| 5,071,578 A | * 12/1991 | Ohkubo et al. | .......... 252/62.54 |
| 5,415,941 A | * 5/1995 | Sugyo et al. | ............ 428/425.9 |

FOREIGN PATENT DOCUMENTS

| JP | 64-72318 | 3/1939 | ............ G11B/5/702 |
|---|---|---|---|
| JP | 61-18809 | 5/1986 | ............ G11B/5/702 |
| JP | 61-190717 | 8/1986 | ............ G11B/5/702 |
| JP | 5-250652 | 9/1993 | ............ G11B/5/702 |

* cited by examiner

*Primary Examiner*—Stevan A. Resan
(74) *Attorney, Agent, or Firm*—Sughrue Mion, PLLC

(57) ABSTRACT

The present invention provides a magnetic recording medium having high dispersion property, good running durability and good preservation property, and it comprises at least one magnetic layer having ferromagnetic powder dispersed by a binder placed on a non-magnetic support member, whereby a polyurethane resin or a polyurethane urea resin consisting of 5 mol % or less of a long chain diol having weight average molecular weight of 800 to 5,000, a short chain diol having weight average molecular weight of 50 to 500 and/or a short chain diamine and an organic diisocyanate is contained as the binder, said long chain diol has one polar group selected from —COOM, —SO$_3$M, —OSO$_3$M, —OPO(OM)$_2$, or —PO(OM)$_2$ (where M represents a hydrogen atom, an alkali metal ion, or an ammonium ion) in the molecule, and the polar group is contained in the polyurethane by 1 to 5 mol %.

8 Claims, No Drawings

MAGNETIC RECORDING MEDIUM

BACKGROUND OF THE INVENTION

The present invention relates to a magnetic recording medium, which comprises a magnetic layer having ferromagnetic powder dispersed in a binder and placed on a non-magnetic support member which has excellent electromagnetic transfer characteristics, high durability and preservation property (shelf life).

Magnetic recording medium is widely used in such applications as recording tape, video tape, floppy disk, etc. In a magnetic recording medium, a magnetic layer having ferromagnetic powder dispersed in a binder is laminated on a non-magnetic support member.

The magnetic recording medium must be at high level in electromagnetic transfer characteristics, running durability, running performance, etc. Specifically, an audio tape for recording and reproducing music must have high level of original sound reproducing ability. A video tape must have high electromagnetic transfer characteristics such as high ability to reproduce the original image.

With the requirement to have high electromagnetic transfer characteristics, the magnetic recording medium also must have good running durability. In general, abrasive material and lubricating material are added in the magnetic layer.

However, in order to obtain high running durability by adding abrasive material, it is necessary to increase the adding quantity to some extent, and this means that filling ratio of the ferromagnetic powder has to be lowered. In case abrasive material having large grain size is used to obtain good running durability, the abrasive material tends to protrude excessively on the surface of the magnetic layer. Therefore, the improvement of the running durability often leads to deterioration of the electromagnetic transfer characteristics.

When the running durability is improved by adding lubricant, the quantity of the added lubricant must be increased. This often makes the binder more easily plasticized and may lower the durability of the magnetic layer.

In improving the durability and electromagnetic transfer characteristics, the binder, which is one of the principal components of the magnetic layer, plays naturally an important role. Vinyl chloride resin, cellulose resin, urethane resin, acrylic resin, etc. as used in the past, cause poor wear-resistant property of the magnetic layer, and this leads to contamination of the running components of the magnetic tape.

To solve this problem, a method is adopted to increase the hardness of the magnetic layer using a hard binder. Polyurethane resin or polyurethane urea resin are used as the binder having such high hardness, and it is known that these compounds can be obtained through polymerization of long chain diol or diamine having weight average molecular weight of 500 to 5,000, low molecular diol having molecular weight of less than 500, chain extender of diamine, and organic diisocyanate in an organic solvent.

It is known that polar groups such as sulfonic acid, carboxylic acid, etc. are introduced into polyurethane to improve dispersion property of the ferromagnetic powder.

For example, the introduction of short chain diol having a polar group such as —$SO_3M$ into a chain extender is described in JP-(B) 61-18809, and the introduciton of a polar group with a chain extender is described in JP-(A) 64-72318. However, short chain diol having polar group has very strong hydrophilic property, and it has lower solubility in organic solvent compared with long chain diol and diisocyanate. This leads to uneven polymerization, and polymerization often occurs in lumps. Because polar group-containing segments are present in polyurethane molecules, association between molecules often occurs, and this leads to lower solubility and insufficient dispersion property.

The use of polyester urethane resin containing —$SO_3M$ is disclosed in JP-(B) 58-41656 (U.S. Pat. No. 4,152,485), and JP-(A) 5-250652 describes the introduction of polar group by formation of polyurethane resin using a part or all of polyhydroxy compound having metal salt of sulfonic acid. Further, JP-(A) 59-198530 (U.S. Pat. No. 4,643,949) discloses the use of sulfonic acid-containing polycarbonate polyurethane. However, the long chain diol containing polar group used in these patent publications is used by 11 mol % at the lowest, and long chain diol not containing polar group is contained by more than 20 mol %. These long chain diols have hydrophilic ester linkage, and this results in lower solubility in solvents and insufficient dispersion property. Ester linkage is easily hydrolyzed and causes poor performance in long-term storage.

JP-(A) 61-190717 describes polyol consisting of polyether polyol. As polyether long chain diol, polyethyleneglycol, polypropyleneglycol, or polytetramethyleneglycol are known, while all of these have very low glass transition temperature (Tg) and are low in strength.

Also, JP-(A) 59-198530 describes polycarbonate urethane containing sulfonic acid. But, polycarbonate is expensive and has high hydrophilic property. It is low in preservation property and has low solubility in organic solvents.

Under such circumstances, there have been strong demands on a magnetic recording medium, which has high electromagnetic transfer characteristics and long-term preservation property with most of the resins having high hardness and has excellent durability under wide range of temperature and humidity conditions.

SUMMARY OF THE INVENTION

To solve the above problems, the magnetic recording medium according to the present invention comprises at least one magnetic layer having ferromagnetic powder dispersed by a binder placed on a non-magnetic support member, whereby a polyurethane resin or a polyurethane urea resin consisting of 5 mol % or less of a long chain diol having weight average molecular weight of 800 to 5,000, a short chain diol having weight average molecular weight of 50 to 500 and/or a short chain diamine and an organic diisocyanate is contained as the binder, said long chain diol has one polar group selected from —COOM, —$SO_3M$, —$OSO_3M$, —$OPO(OM)_2$, or —$PO(OM)_2$ (where M represents a hydrogen atom, an alkali metal ion, or an ammonium ion) in the molecule, and the polar group is contained in the polyurethane by 1 to 5 mol %.

The present invention also provides a magnetic recording medium as described above, wherein said magnetic layer is arranged on a non-magnetic layer where non-magnetic powder is dispersed in a binder.

It also provides a magnetic recording medium as described above, wherein a polyurethane resin contains a long chain diol given by the following formula (1) by 1 to 5 mol %:

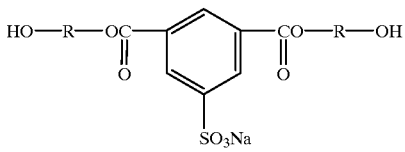

(Formula 1)

where R represents a polyalkyleneglycol residual group.

Further, the present invention provides a magnetic recording medium as described above, wherein a polyurethane resin contains a short chain diol and/or diamine having a cyclohexane ring given by the following formulae (2) or (3):

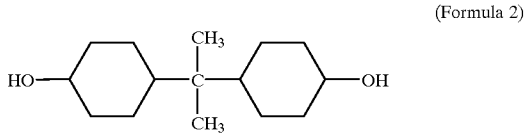

(Formula 2)

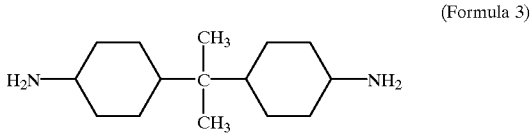

(Formula 3)

DESCRIPTION OF THE PREFERRED EMBODIMENTS

The binder for the magnetic recording medium of the present invention comprises polyurethane resin, polyurethane urea resin and/or polyurea resin. Diol or diamine used as chain extender comprises a short chain diol or a short chain diamine as principal components, and a long chain diol having weight average molecular weight of 800 to 5,000 is normally used in these resins by 5 mol % or less to polyurethan urea resin and/or polyurea resin. Further, by introducing a polar group into the long chain diol, the polar group can be introduced evenly, and this solves the problems of localization or easy association of polar group.

Conventionally, the long chain diol is contained in polyurethane by 10 mol % or more, while it is contained by 5 mol % or less, or preferably by 1 to 5 mol % in the present invention. A short chain diol or diamine for forming resin with higher hardness is used by 95 mol % or more, and this leads to higher strength of film and to high Tg. Thus, the film is not easily peeled off even when the magnetic head slides along and may be partially heated to high temperature.

When the long chain diol used in the present invention has weight average molecular weight of less than 800, the polar group is easily localized and dispersion property tends to decrease. On the other hand, if it is higher than 5,000, Tg tends to be lower, still durability tends to decrease, and it tends to be more adhesive. It is preferable that the short chain diol or the short chain diamine has weight average molecular weight of 50 to 500. If it is higher than 500, Tg becomes lower, still durability tends to decrease, and it becomes more adhesive.

As the long chain diol, polyester type, polyether type, polyether ester type, polycarbonate type, etc. may be used.

As the polyester polyol, the one obtained by reaction of dibasic acid with glycol is used. As the dibasic acid, aromatic dicarboxylic acid such as terephthalic acid, isophthalic acid, orthophthalic acid, 1,5-naphthalic acid, etc., aromatic oxycarboxylic acid such as p-oxybenzoic acid, p-(hydroxyethoxy)-benzoic acid, etc., aliphatic dicarboxylic acid such as succinic acid, adipic acid, azelaic acid, sebacic acid, dodecanedicarboxylic acid, etc., or tri- and tetra-carboxylic acid such as trimellitic acid, trimesic acid, pyromellitic acid, etc. may be used. Also, 5-sodium-sulfoisophthalic acid, 5-potassium-sulfoisophthalic acid, 2-sodium-sulfoterephthalic acid, 2-potassium-sulfoterephthalic acid, etc. may be used.

As the glycol, ethyleneoxide addition product and propyleneoxide addition product of ethyleneglycol, propyleneglycol, 1,3-propanediol, 1,4-butanediol, 1,5-pentanediol, 1,6-hexanediol, neopentylglycol, diethyleneglycol, dipropyleneglycol, 2,2,4-trimethyl-1,3-pentanediol, 1,4-cyclohexanedimethanol, or bisphenol A, or ethyleneoxide addition product and propyleneoxide addition product of hydrogenated bisphenol A, and polythyleneglycol, polypropyleneglycol, polytetramethyleneglycol, etc. may be used. Also, tri- and tetraol such as trimethylolmethane, trimethylolpropane, glycerine, pentaerythritol, etc. may be used.

As the polyether type long chain diol, ethyleneoxide addition product, propyleneoxide addition product, polytetramethylene addition product, etc. of polyethylene-glycol, polypropyleneglycol, or bisphenol A may be used.

It is preferable to use ether-ester diol obtained from dibasic acid, which contains metal salt of sulfonic acid and polyether diol because it is not easily hydrolyzed and has good preservation stability as well as high solubility in organic solvents and good dispersion property.

As the preferable dibasic acid, 5-sodium-sulfoiso-phthalic acid, 5-potassium-sulfoisophthalic acid, 2-sodium-sulfoterephthalic acid, and dimethylester of these compounds may be used.

As the preferable polyether diol, ethyleneoxide addition product of polyethleneoxide, polypropyleneoxide and propyleneoxide addition product of bispnenol A, ethyleneoxide addition product and propyleneoxide addition product of hydrogenated bisphenol A may be used.

It is preferable that weight average molecular weight of polyether diol is 300 to 2,000.

Of these dibasic acids and polyether diols, it is more preferable to use a combination of 5-sodium-sulfoisophthalic acid and polypropyleneoxide or polyethyleneoxide.

As the polar group, —COOM, —SO$_3$M, —OSO$_3$M, —OPO(OM)$_2$, or —PO(OM)$_2$ (where M represents a hydrogen atom, an alkali metal ion, or an ammonium ion) may be used, or more preferably, —SO$_3$M, —OSO$_3$M, —OPO(OM)$_2$, or —PO(OM)$_2$, or most preferably, —SO$_3$M or —OSO$_3$M may be used.

It is preferable that the polar group is contained in polyurethane by $1 \times 10^{-5}$ eq/g to $10^{-4}$ eq/g.

If the polar group is contained by less than $1 \times 10^{-5}$ eq/g, adsorption to the ferromagnetic powder is not sufficient, and dispersion property is decreased. if it is contained by more than $2 \times 10^{-4}$ eq/g, long diol content is higher, and this leads to lower strength and poorer still durability.

As the short chain diol or the short chain diamine having weight average molecular weight of 50 to 500 used for polyurethane resin and polyurethane urea resin of the present invention, the following substances may be used:

For example, aliphatic diols or cycloaliphatic diols such as ethyleneglycol, 1,3-propylenediol, 1,2-propylene-glycol, 1,4-butanediol, 1,5-pentanediol, 1,6-hexanediol, 2,2- dimethylpropanediol, 1,8-octanediol, 1,9-nonanediol, diethyleneglycol, cyclohexane-1,4-diol, cyclohexane-1,4-dimethanol, or aromatic diol such as bisphenol A or ethyleneoxide of bisphenol A or propyleneoxide addition product, or diol such as ethyleneoxide of N-diethanolamine or propyleneoxide addition product, may be used. Of these substances, it is more preferable to use bisphenol A, bisphenol S or hydrogenated product or ethyleneoxide of these substances or propyleneoxide addition product having cyclic structure. When these substances are used, high Tg can be obtained, and no increase of the defects of reproducing signal or no head contamination occurs. Most preferably, hydrogenated substance may be used. If hydrogenated substance is used, high Tg can be obtained, and the magnetic layer does not become brittle. As a result, head contamination by running or defects of reproducing signal do not occur.

As the short chain diamine, aliphatic diamine such as tetramethylenediamine, hexamethylenediamine, etc., or aromatic diamine such as m-phenylenediamine, p-phenylenediamine, 2,4-tolylenediamine, 2,6-tolylenediamine, 4,4'-biphenylenediamine, 1,5-naphthalenediamine, etc., or cycloaliphatic diamine such as 1,3-diaminomethylcyclohexanone, 1,4-diaminomethylcyclohexanone, 4,4'-diaminomethylcyclohexylmethane, or isophoronediamine may be used.

Of these short chain diols or short chain diamines as described above, it is more preferable to use a short chain diol or a short chain diamine having cyclohexane ring as given by the above formulae (2) and (3). These substances have cyclic and hence rigid molecular structures. Tg and strength are higher. Solubility in solvents is not decreased because these are cycloaliphatic compounds.

As the organic diisocyanate, aromatic diisocyanate such as 2,4-tolylenediisocyanate, 2,6-tolylenediisocyanate, xylene-1,4-diisocyanate, xylene-1,3-diisocynate, 4,4'-diphenylmethane-diisocyanate, 4,4-diphenyletherdiisocyanate, 2-nitrodiphenyl-4,4'-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate, 3,3'-dimethoxydiphenyl-4,4-diisocyanate, etc., aliphatic diisocyanate such as tetramethylenediisocyanate, hexamethylenediisocyanate, lysinediisocyanate, etc. or cycloaliphatic diisocyanate such as isophoronediisocyanate, hydrogenated tolylenediisocyanate, hydrogenated diphenylmethanediisocyanate, etc. may be used.

It is more preferable to use aromatic diisocyanate, and most preferably, 4,4-diphenylmethanediisocyanate, 2,2-tolylenediisocyanate, p-phenylenediisocyanate, isophoronediisocyanate may be used.

It is preferable that polyurethane resin or polyurethane urea resin is contained in the binder by 10 to 90 weight %. When these two substances are mixed, it is preferable that the total quantity is within the above range. If it is less than 10 weight %, dispersion property tends to decrease probably because lower solubility in organic solvents. If it is more than 90 weight %, the magnetic film is softened. As a result, the head is contaminated after repeated running, and durability tends to decrease.

It is preferable that weight average molecular weight of polyurethane resin or polyurethane urea resin is 10,000 to 100,000, or more preferably, 20,000 to 800,000, or most preferably 30,000 to 70,000. If the weight average molecular weight is less than 10,000, film strength is lowered and running durability may decrease. If the weight average molecular weight is more than 200,000, the solubility in solvents decreases, and dispersion property tends to be lower.

The number of hydroxyl groups in polyurethane resin or polyurethane urea resin is preferably 3 to 20, or more preferably 3.5 to 10, or most preferably 4 to 6. If it is less than 2, reactivity with isocyanate curing agent is low, and film strength decreases. If it exceeds 10, viscosity of coating solution increases, and dispersion property decreases.

Glass transition temperature (Tg) of polyurethane resin or polyurethane urea resin is preferably 40 to 120° C., or more preferably 45 to 110° C., or most preferably 50 to 90° C. If it is lower than 40° C., film strength is low, and running durability also decreases. If it is more than 120° C., the solubility in solvents decreases, and this leads to lower dispersion property.

In case the binder of the present invention is used in the magnetic layer, vinyl chloride type synthetic resin may be simultaneously used with polyurethane resin or polyurethane urea resin of the present invention. The degree of polymerization of the vinyl chloride resin for simultaneous use is preferably 200 to 600, or more preferably 250 to 450. As the vinyl chloride resin, vinyl monomer, e.g. vinyl acetate, vinyl alcohol, vinylidene chloride, acrylonitrile, etc. may be copolymerized and used.

In addition to polyurethane resin, polyurethane urea resin and vinyl chloride resin of the present invention, various types of synthetic resin may be used to form the magnetic layer. For example, cellulose derivatives such as ethylene-vinyl acetate copolymer, nitrocellulose resin, etc. or acrylic resin, polyvinyl acetal resin, polyvinyl-butyral resin, epoxy resin, or phenoxy resin may be used. These substances can be used alone or in combination.

In case the other synthetic resin is simultaneously used, the polyurethane resin or the polyurethane urea resin in the magnetic layer is contained in the binder preferably by 10 to 90 weight %, or more preferably by 20 to 80 weight or most preferably by 25 to 60 weight %. The vinyl chloride resin is contained in the binder by 10 to 80 weight %, or more preferably by 20–70 weight %, or most preferably by 30 to 60%.

Curing agents such as polyisocyanate compounds may be used together with the binder of the present invention. As the polyisocyanate compound, reaction product of 3 mols of tolylenediisocyanate and 1 mol of trimethylolpropane (e.g. Desmodule L-75, manufactured by Bayer AG), reaction product of 3 mols of diisocyanate such as xylylenediisocyanate or hexamethylenediisocyanate and 1 mol of trimethylolpropane, buret addition compound of 3 mols of hexamethylenediiso-cyanate, isocyanurate compound of 5 mols of tolylene-diisocyanate, isocyanurate addition compound of 3 mols of tolylenediisocyanate and 2 mols of hexamethylene-diisocyanate, and polymer of isophoronediisocyanate and diphenylmethanediisocyanate may be used.

The polyisocyanate compound in the magnetic layer is preferably contained in the binder within the range of 10 and 50 weight %, or more preferably by 20 to 40 weight %.

In case curing is performed by electron beam irradiation, a compound having reactive double bond such as urethane acrylate may be used.

Total weight of resin component and curing agent (i.e. binder) is preferably within the range of 15–40 weight parts to 100 weight parts of ferromagnetic powder, or more preferably by 20–30 weight %.

The ferromagnetic powder used in the magnetic recording medium of the present invention is preferably ferromagnetic iron oxide powder, ferromagnetic iron oxide powder containing cobalt, or ferromagnetic alloy powder having $S_{BET}$ specific surface area of 40 to 80 m$^2$/g, or more preferably 50 to 70 m$^2$/g. Crystallite size is preferably 12 to 25 nm, or more preferably 13 to 22 nm, or most preferably 14 to 20 nm. Major axis length is preferably 0.05 to 0.25 μm, or more preferably 0.07 to 0.2 μm, or most preferably 0.08 to 0.15 μm. As the ferromagnetic powder, Fe, Ni, Fe—Co, Fe—Ni, Co—Ni, Co—Ni—Fe, Fe—Al, Fe—Al——Si, Fe—Si, etc. may be used. With metal component within 20 weight %, alloys containing aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, mercury, lead, phosphorus, lanthanum, cerium, praseodymium, neodymium, tellurium, or bismuth may be used. Of these substances, it is more preferable to use aluminum, silicon and yttrium. The ferromagnetic metal powder may contain small quantity of water, hydroxide or oxide.

The method for manufacturing the ferromagnetic powder is already known, and the ferromagnetic powder used in the present invention can be manufactured by the known method.

There is no special restriction on the shape of the ferromagnetic powder. Normally, ferromagnetic powder in needle shape, granular shape, cubic shape, grain shape, or planar shape may be used. In particular, it is preferable to use ferromagnetic powder in needle shape. The ratio of major axis length to minor axis length is preferably 2 to 12, or more preferably 4 to 10, or most preferably 5 to 8.

The above resin components, curing agent and ferromagnetic powder are mixed with and dispersed in solvents normally used for preparation of magnetic coating materials such as methylethylketone, dioxane, cyclohexanone, ethyl acetate, etc. to prepare magnetic coating material. Mixing and dispersion can be carried out by the methods already known.

In addition to the above components, the magnetic coating material may contain the normally used additives or fillers including abrasive materials such as α-Al$_2$O$_3$, Cr$_2$O$_3$, etc., antistatic agent such as carbon black, fatty acids, fatty acid ester, lubricant such as silicone oil, dispersion agent, etc.

The magnetic coating material prepared from the above substances is coated on a non-magnetic support member to form the magnetic layer.

In the method for manufacturing the magnetic recording medium of the present invention, a coating solution for the magnetic layer is coated preferably with the thickness after drying of the magnetic layer within the range of 0.5 to 10 μm on the surface of the non-magnetic support member under running condition, or more preferably within the range of 1.5–7.0 μm. In this case, a plurality of magnetic coating materials may be coated sequentially or in duplicate layers.

As a coating machine for coating the above magnetic coating materials, air doctor coat, blade coat, rod coat, extrusion coat, air knife coat, squeeze coat, impregnation coat, reverse roll coat, transfer roll coat, gravure coat, kiss coat, cast coat, spray coat, spin coat, etc. may be used. For the details of these coating machines, "The Newest Coating Technique" published by General Technical Center Inc. (published on May 31, 1983) may be referred.

In case the present invention is applied for a magnetic recording medium having an arrangement of two layers or more, the following coating machines and methods may be recommended:

(1) The underlayer is coated by gravure, roll, blade, or extrusion coating machines generally applied for the coating of magnetic coating materials. While the underlayer is not yet dried, upper layer is coated by a support pressure type extrusion coating machine disclosed in JP-(B) 1-46186, JP-(A) 60-238179, JP-(A) 2-265672, etc.

(2) Upper and lower layers are coated almost at the same time using a coating head having 2 coating solution slits as disclosed by JP-(A) 63-88080, JP-(A) 2-17971, or JP-(A) 2-265672.

(3) Upper and lower layers are coated almost at the same time using an extrusion coating machine equipped with backup rolls as disclosed in JP-(A) 2-174965.

A back-coat layer (backing layer) may be provided on the surface not coated with the magnetic coating material of the non-magnetic support member of the present invention. Usually, the back-coat layer is a layer where a back layer forming material comprising granular components such as abrasive material and antistatic agent as well as binder dispersed in organic solvent is coated on the surface not coated with the magnetic coating material of the non-magnetic support member.

A layer of adhesive agent may be provided on the coating surface coated with the magnetic coating material of the non-magnetic support member and back-coat layer forming material.

The layer coated with the magnetic coating material is dried after magnetic field orientation processing has been performed for the ferromagnetic powder contained in the coating layer coated with the magnetic coating material.

After being dried as described above, surface smoothening process is performed for the coating layer. For the surface smoothening process, super-calender rolls are used, for example. By the surface smoothening process, pores caused by removal of the solvent during drying process are eliminated, and filling ratio of the ferromagnetic powder in the magnetic layer is improved, and this makes it possible to produce a magnetic recording medium having high electromagnetic transfer charateristics.

The magnetic recording medium of the present invention has preferably a very smooth surface, which is within the range of 0.1–4 nm, or more preferably within the range of 1–3 nm with cutoff value of 0.25 mm. This is completed by performing the above calender processing on the magnetic layer which has been formed by selecting specific types of ferromagnetic powder and binders as described above. Calender processing conditions are as follows: The temperature of the calender roll is preferably within the range of 60–100° C., or more preferably 70–100° C., or most preferably 80–100° C. The pressure is preferably within the range of 100–500 kg/cm$^2$, or more preferably within the range of 200–450 kg/cm$^2$, or most preferably 300–400 kg/cm$^2$.

The laminated member prepared by curing process as described above is cut into the desired shape. The cutting may be performed by a cutter as normally used.

In the magnetic recording medium of the present invention, the long chain diol containing polar group in the polyurethane resin is contained by 5 mol %, or more preferably by 1 to 5 mol %, while the long chain diol containing polar group is contained by about 10 to 50 mol % in the polyurethane resin already known. Because it mostly consists of materials having high hardness such as short chain diol, diamine, diisocyanate, etc., the film has high glass transition temperature (Tg), high strength and good running durability. In particular, it has good still durability under high temperature conditions. Further, because of high Tg value, the surface of the magnetic layer is less adhesive and is not easily stuck even when it is stored at high temperature.

Because polar group having short chain diol or diamine is not introduced and long chain diol containing polar group is used in very small quantity, the solubility in solvents is increased during polyurethane polymerization of polar group-containing compound, and this provides even polymerization. Because no polar group is present in the molecules, dispersion property of the ferromagnetic powder is increased due to improvement of the solubility of polyurethane in the solvent, and this may have resulted in excellent electromagnetic conversion property.

EXAMPLES

Next, description will be given on synthesis examples of the compounds of the present invention and the characteristics of the magnetic recording medium manufactured using such compounds.

Synthesis Example 1

Synthesis of Sulfonic Acid Diol, Compound A

In a four-port flask of 500 ml volume equipped with a nitrogen introducing tube, stirrer motor, thermometer, and condenser for distillation, 59.2 g (0.2 mol) of 5-sodium-sulfoisophthalic acid dimethylester, 132 g (0.44 mol) of polyethyleneoxide 300, and 0,5 g (2 mmol) of manganese acetate were weighed, placed in the flask, and stirred up. The flask was mounted on an oil bath maintained at 240° C., and this was heated under nitrogen stream. With the progress of ester exchange reaction, about 13 g of methanol was distillated. The temperature of the distillated portion was 65 to 78° C. Heating and stirring were continued further for 9 hours. Then, the content of the flask was cooled down, and this was used for urethanization reaction as the compound A. The compound A thus obtained had molecular weight of 800.

Synthesis Example 2

Synthesis of Sulfonic Acid Diol, Compound B

In a four-port flask of 500 ml volume equipped with a nitrogen introducing tube, stirrer motor, thermometer, and condenser for distillation, 29.6 g (0.1 mol) of 5-sodium-sulfoisophthalic acid dimethylester, 440 g (0.22 mol) of polyethyleneoxide 2000, and 0.5 g (2 mmol) of zinc acetate were weighed, placed into the flask, and stirred up. The flask was mounted on an oil bath maintained at 240° C., and this was heated under nitrogen stream. With the progress of ester exchange reaction, about 6 g of methanol was distillated. The temperature of the distillated portion was 65 to 78° C. Heating and stirring were continued further for 9 hours. Then, the content of the flask was cooled down and was diluted with toluene to prepare a 50% solution. This was used for urethanization reaction as the compound B. The compound B had molecular weight of 4200.

Synthesis Example 3

Synthesis of Sulfonic Acid Diol, Compound C

In a four-port flask of 500 ml volume equipped with a nitrogen introducing tube, stirrer motor, thermometer, and condenser for distillation, 29.6 g (0.1 mol) of 5-sodium-sulfoisophthalic acid dimethylester, 13.6 g (0.22 mol) of ethyleneoxide, and 0,5 g (2 mmol) of zinc acetate were weighed, placed in the flask, and stirred up. The flask was mounted on an oil bath maintained at 240° C., and this was heated under nitrogen stream. With the progress of ester exchange reaction, about 6 g of methanol was distillated. The temperature of the distillated portion was 65 to 78° C. Heating and stirring were continued further for 9 hours. Then, the content of the flask was cooled down and was diluted with toluene to prepare 50% solution. This was used for urethanization reaction as the compound C. The compound C had molecular weight of 360.

Synthesis Example 4

Synthesis of Sulfonic Acid Diol, Compound D

In a four-port flask of 500 ml volume equipped with a nitrogen introducing tube, stirrer motor, thermometer, and condenser for distillation, 29.6 g (0.1 mol) of 5-sodium-sulfoisophthalic acid dimethylester, 660 g (0.22 mol) of polyethyleneoxide 3000, and 0,5 g (2 mmol) of zinc acetate were weighed, placed in the flask, and stirred up. The flask was mounted on an oil bath maintained at 240° C., and this was heated under nitrogen stream. With the progress of ester exchange reaction, about 6 g of methanol was distillated. The temperature of the distillated portion was 65 to 78° C. Heating and stirring were continued further for 9 hours. Then, the content of the flask was cooled down and was diluted with toluene to prepare 50% solution. This was used for urethanization reaction as the compound D. The compound D had molecular weight of 6200.

Synthesis Example 5

Synthesis of Sulfonic Acid Diol, Compound E

In a four-port flask of 500 ml volume equipped with a nitrogen introducing tube, stirrer motor, thermometer, and condenser for distillation, 29.6 g (0.1 mol) of 5-sodium-sulfoisophthalic acid dimethylester, 132 g (0.22 mol) of polypropyleneoxide 600, and 0.5 g (2 mmol) of zinc acetate were weighed, placed in the flask, and stirred up. The flask was mounted on an oil bath maintained at 240° C., and this was heated under nitrogen stream. With the progress of ester exchange reaction, about 6 g of methanol was distillated. The temperature of the distillated portion was 65 to 78° C. Heating and stirring were continued further for 9 hours. Then, the content of the flask was cooled down and was diluted with toluene to prepare 50% solution. This was used for urethanization reaction as the compound E. The compound E had molecular weight of 1400.

Synthesis Example 6

Synthesis Example of Polyurethane Urea Resin

To a container equipped with reflux condenser and stirrer and substituted with nitrogen in advance, the polar group-containing long chain diols (compounds A to E) and the short chain diol of the formula 2 and/or the short chain diamine of the formula 3 were dissolved in the mol ratio as shown in Table 1 at 60° C. under nitrogen stream in cyclohexanone. Next, di-n-dibutyl tin dilaurate was added as catalyst by 60 ppm to total quantity of the above materials, and this was further dissolved for 15 minutes. Then, MDI was added to attain OH/NCO=1/1.03, and this was heated and allowed to react at 90° C. for 6 hours. As a result, polyurethane resins or polyurethane urea resins (A) to (P) were obtained.

Polurethane resin Q was obtained as follows: By the procedure described for the examples in JP-(B) 58-41565, 9.9 g of polyester polyol containing SO₃Na, 76 g of polyester polyol not containing SO₃Na, 71 g of MDI as well as di-n-dibutyl tin dilaurate as catalyst were added in a solvent [toluene: methylisobutylketone=1.5 (128 g): 1 (85 g)]. This was maintained at temperature between 70– 90 ° C. and was allowed to react for 8 hours.

Polyurethane R was obtained as follows: By the procedure described for the examples in JP-(B) 61-18809, 100 g (15 mol %) of polycaprolactone polyol (PCP 0240; Union Carbide), 50 g (58 mol %) of diisocyanate (Sumijule; Sumitomo Chemical Co., Ltd.), 4.5 g (15 mol %) of 1,4-butanediol as shown in the table were allowed to react at 60° C. for 30 minutes. Then, 15 g (12 mol %) of sulfoisophthalic acid ethyleneoxide addition product (DEIS; Sumitomo Chemical Co., Ltd.) was added. Further, with the increase of viscosity, 463 g of methylethylketone was added, and this was allowed to react for 3 hours at 85° C. under reflux of methylethylketone.

Next, the following compounds were added:

| | |
|---|---|
| Polyurethane urea resin (A) | 12.5 parts (solids) |
| Abrasive agent (alumina; average grain size 0.3 μm) | 2 parts |
| Carbon black (grain size 40 nm) | 2 parts |
| Methylethylketone/toluene = 1/1 | 200 parts | and these were dispersed for 120 minutes by sand mill. Then,

| | |
|---|---|
| Polyisocyanate (Coronate 3041; Nippon Polyurethane Co.) | 5 parts (solid) |
| Butyl stearate | 2 parts |
| Stearic acid | 1 part |
| Methylethylketone | 50 parts |

TABLE 1

| | Type, weight average molecular weight and quantity of diol of formula 1 containing SO₃Na | | Mol % of diol/diamine | | | | Polar group content in polyurethan (mol %) |
|---|---|---|---|---|---|---|---|
| | Mw | mol % | Short chain diol (Formula 2) | Short chain diamine (Formula 3) | Mol % of MDI | Weigt average Mw of polyurethane | |
| A | Compound A 800 | 1 | 50.5 | 0 | 48.5 | 51000 | 1 |
| B | Compound A 800 | 5 | 46.5 | 0 | 48.5 | 48000 | 5 |
| C | Compound B 4200 | 5 | 46.5 | 0 | 48.5 | 48000 | 5 |
| D | Compound A 800 | 1 | 0 | 50.5 | 48.5 | 50500 | 1 |
| E | Compound A 800 | 5 | 0 | 46.5 | 48.5 | 49500 | 5 |
| F | Compound B 4200 | 5 | 0 | 46.5 | 48.5 | 48000 | 5 |
| G | Compound C 360 | 1.5 | 50.0 | 0 | 48.5 | 51000 | 1.5 |
| H | Compound D 6200 | 5 | 46.5 | 0 | 48.5 | 52000 | 5 |
| I | Compound A 800 | 6 | 45.5 | 0 | 48.5 | 51000 | 6 |
| J | Compound B 4200 | 6 | 45.5 | 0 | 48.5 | 51500 | 6 |
| K | Compound C 360 | 1.5 | 0 | 50.0 | 48.5 | 49000 | 1.5 |
| L | Compound D 6200 | 5 | 0 | 46.5 | 48.5 | 49000 | 5 |
| M | Compound A 800 | 6 | 0 | 45.5 | 48.5 | 52000 | 6 |
| N | Compound B 4200 | 6 | 0 | 45.5 | 48.5 | 51000 | 6 |
| O | Compound E 1400 | 1.5 | 50.0 | 0 | 48.5 | 50000 | 1.5 |
| P | Compound E 1400 | 5 | 46.5 | 0 | 48.5 | 48000 | 5 |
| Q | Polyester polyol containing SO₃Na | | 11 mol % | | | 48000 | 11 |
| | Polyester polyol not containing SO₃Na | | 42 mol % | | | | |
| | MDI | | 47 mol % | | | | |
| R | Polycaprolactonepolyol (Union Carbide; PCP 0240) | | 15 mol % | | | 47000 | 12 |
| | 1,4-butanediol | | 15 mol % | | | | |
| | Sulfoisophthalic acid ethyleneoxide addition product (Sumitomo Chemical; DEIS) | | 12 mol % | | | | |
| | Diisocyanate (Sumijule) | | 58 mol % | | | | |

In Table 1, the compound of the formula 2 has molecular weight of 240, and the compound of the formula 3 has molecular weight of 242.

In the following examples, the word "part(s)" means "weight part(s)".

Example 1

One hundred parts of ferromagnetic alloy powder (composition: Fe 94%, Zn 4%, Ni 2%, Hc 1500e, crystallite size 20 nm, major axis length 0.16 μm, major axis length/minor axis length=8, saturation magnetization (δs) 140 emu/g) were pulverized for 10 minutes by an open kneader. Then, this was kneaded with 10 parts of a compound obtained by adding hydroxyethylsulfonate sodium salt to a copolymer of vinyl chloride/vinyl acetate/glycidyl methacrylate=86/9/5 (SO₃Na=6×10⁻⁵ eq/g; epoxy group= 10⁻³ eq/g, weight average molecular weight=30,000) and 60 parts of methylethylketone.

were added, and after stirring and mixing for 20 minutes, the mixture was filtered through a filter having average pore size of 1 μm to prepare a magnetic coating material. The magnetic coating material thus obtained was coated on a polyethylene-naphthalate support member of 10 μm in thickness so that the thickness of the coating film after drying was to be 2.5 μm.

On the non-magnetic support member with the magnetic coating material coated on it, magnetic field orientation was performed using a magnet of 3000 Gauss while the magnetic coating material is not yet dried. After drying, calender processing by a combination of metal roll—metal roll—metal roll—metal roll—metal roll—metal roll—metal roll was conducted at the rate of 85 m/min., linear pressure 300 kg/cm and temperature 90° C., and it was cut into pieces each having width of 8 mm.

Examples 2 to 6, Example 9 and Comparative Examples 1 to 10

Polyurethane resin was prepared by the same procedure as in Example 1 except that the polyurethane resin A in Example 1 was changed to the polurethanes B to N respectively as shown in Table 2.

Example 7 and Comparative Example 11

In the magnetic layer for upper layer of Example 7, Example 1 was used. In the magnetic layer for upper layer of Comparative Example 11, Comparative Example 1 was used.

The following compounds were used for the magnetic layer for lower layer:

Magnetic Layer for Lower Layer

| | |
|---|---|
| Co-γ-FeOX | 100 parts |
| (x = 1.45; major axis length 0.25 μm; Hc8500e, Br1400 Gauss) | |
| Vinyl chloride/vinyl acetate copolymer | 11 parts |
| (containing sulfonic acid by 0.25 weight %) | |
| Polyurethane resin A | 4 parts |
| Polyisocyanate (Coronate 3041; Nippon Polyurethane Co.) | 6 parts |
| Stearic acid | 1 part |
| Butyl stearate | 1 part |
| Carbon black (average grain size 20 nm) | 5 parts |
| Methylethylketone/cyclohexanone = 7/3 | 200 parts |

The coating solution was conditioned using open kneader and side grinder, and simultaneous multi-layer coating was performed on polyethyleneterephthalate support member of 10 μm thick so that the upper layer has thickness of 0.2 μm and the lower layer has thickness of 2.8 μm.

Next, while the magnetic coating material is not dried yet, magnetic field orientation was performed using a magnet of 3000 Gauss. After drying, calender processing by a combination of metal roll—metal roll—metal roll—metal roll—metal roll—metal roll—metal roll was conducted at the rate of 80 m/min, linear pressure 300 kg/cm, and temperature 90° C., and it was cut into pieces each having width of 8 mm.

Example 8 and Comparative Example 12

In Example 8, Example 1 was used as the magnetic layer for upper layer. For Comparative Example 12, Comparative Example 1 was used in the magnetic layer for upper layer. Non-magnetic coating material for lower layer was prepared as in Example 7 using the following compounds:

Non-magnetic Layer for Lower Layer

| | |
|---|---|
| Titanium dioxide | 85 parts |
| (Average grain size 0.035 μm; crystal type rutile, TiO$_2$ content 90% or more; Surface processing layer: alumina; S$_{BET}$ 35 to 42 m$^2$/g; true specific gravity 4.1; pH 6.5 to 8.0) | |
| Carbon black (average grain size 20 nm) | 5 parts |
| Vinyl chloride copolymer | 11 parts |
| (containing sulfonic acid by 0.25 weight %) | |
| Polyurethane resin | 4 parts |
| (containing sulfonic acid by 0.25 weight %) | |
| Methylethylketone/cyclohexanone = 7/3 | 200 parts |

Next, the characteristics of video tape of Examples and video tape of Comparative Examples were determined by the following method. The results are summarized in Table 2.

Measuring Method (1) Electromagnetic Transfer Characteristics

Signal was recorded on and reproduced from the specimen tape using Hi8-VTR (TR-705; Sony Corporation). S/N ratio in this case was measured by noise meter and was expressed in the relative value with the value of the tape of the Comparative Example 1 as 0 dB.

(2) Surface Roughness Ra

By light interference method using digital optical profimeter (manufactured by WYKO), central line average roughness Ra was obtained with cutoff value of 0.25 mm.

(3) Glossiness

Light reflectivity at incident angle of 45° was evaluated in the relative value with Comparative Example 1 as 100.

(4) Still Durability

Using the same VTR as in the measurement of electromagnetic transfer characteristics, color bar signal was recorded, and the duration until still mode output decreased to 6 dB under the conditions of 40° C. and 80% RH was evaluated. The measuring time was 60 minutes at the longest.

(5) Storage Adhesion

The specimen tape of 90-minute length was wound on a cassette and was stored for one month at 60° C. and 90% RH. Then, the tape was unwound, and it was checked by visual inspection whether the tape adhered or not.

TABLE 2

| | Polyurethane Polyurethane urea | Glossiness | Ra (nm) | Electromagnetic transfer characteristics | Still durability (min) | Storage adhesion |
|---|---|---|---|---|---|---|
| Example 1 | A | 110 | 3.2 | +0.5 | 60 or more | Not found |
| Example 2 | B | 115 | 3 | +0.5 | 60 or more | Not found |
| Example 3 | C | 115 | 3 | +0.6 | 60 or more | Not found |
| Example 4 | D | 110 | 3 | +0.4 | 60 or more | Not found |
| Example 5 | E | 115 | 3 | +0.4 | 60 or more | Not found |
| Example 6 | F | 115 | 3 | +0.6 | 60 or more | Not found |
| Example 7 | A | 118 | 2.6 | +0.7 | 60 or more | Not found |
| Example 8 | A | 117 | 2.6 | +0.9 | 60 or more | Not found |
| Example 9 | O | 110 | 3.2 | +0.5 | 60 or more | Not found |
| Example 10 | P | 114 | 3 | +0.5 | 60 or more | Not found |
| Comparative Example 1 | G | 100 | 3.3 | 0.0 | 30 | Not found |
| Comparative Example 2 | H | 102 | 3.4 | +0.5 | 40 | Found |
| Comparative Example 3 | I | 113 | 3 | +0.4 | 40 | Found |
| Comparative Example 4 | J | 112 | 2.9 | +0.5 | 30 | Found |
| Comparative Example 5 | K | 102 | 3.4 | −0.1 | 30 | Not found |
| Comparative Example 6 | L | 104 | 3.5 | +0.4 | 40 | Found |
| Comparative Example 7 | M | 113 | 3 | +0.5 | 30 | Found |
| Comparative Example 8 | N | 113 | 2.9 | +0.6 | 40 | Found |
| Comparative Example 9 | Q | 95 | 3.8 | −0.3 | 15 | Found |
| Comparative Example 10 | R | 96 | 3.7 | −0.2 | 15 | Found |

In the magnetic recording medium of the present invention, short chain diol and short chain diamine are used in polyurethane urea and/or poly urea employed as materials for the binder, and polar group is introduced in polyol with long chain length, and these are contained in small quantity. As a result, as a binder for a magnetic recording medium, high dispersion property and good electromagnetic transfer characteristics can be obtained. Because high strength is assured, still durability and preservation property are improved.

What we claim are:

1. A magnetic recording medium, comprising a magnetic layer containing ferromagnetic powder dispersed by a binder, the magnetic layer being located on a non-magnetic support member, wherein said binder comprises a polyurethane resin prepared by reacting a long chain diol having a weight average molecular weight of 800 to 5,000, a short chain diol having a weight average molecular weight of 50 to 500, and an organic diisocyanate, wherein said long chain diol is present in said polyurethane resin in an amount of 1 to 5 mol % and is represented by the following formula (1):

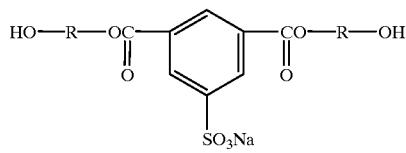

(Formula 1)

where R represents a polyalkyleneglycol residual group, wherein said a short chain diol contains a cyclohexane ring represented by the following formulae (2):

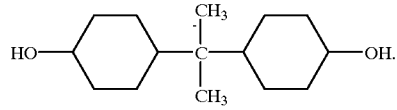

(Formula 2)

2. A magnetic recording medium, comprising:

a magnetic layer containing ferromagnetic powder dispersed by a binder, the magnetic layer being located on a non-magnetic support member, wherein said binder comprises a polyurethane resin prepared by reacting a long chain diol having a weight average molecular weight of 800 to 5,000, a short chain diol having a weight average molecular weight of 50 to 500, and an organic diisocyanate, wherein said long chain diol is present in said polyurethane resin in an amount of 1 to 5 mol % and is represented by the following formula (1):

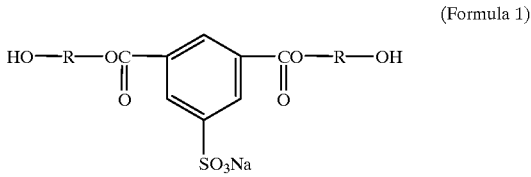

(Formula 1)

where R represents a polyalkyleneglycol residual group and wherein said short chain diol contains a cyclohexane ring represented by the following formulae (2):

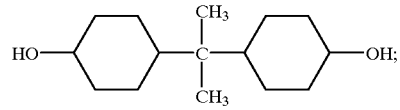

(Formula 2)

and a non-magnetic layer comprising non-magnetic powder dispersed in a binder, the magnetic layer being located on the non-magnetic layer.

3. A magnetic recording medium, comprising a magnetic layer containing ferromagnetic powder dispersed by a binder, the magnetic layer being located on a non-magnetic support member, wherein said binder comprises a polyurethane urea resin prepared by reacting a long chain diol having a weight average molecular weight of 800 to 5,000, a diamine, and an organic diisocyanate, wherein said long chain diol is present in said polyurethane urea resin in an amount of 1 to 5 mol % and is represented by the following formula (1):

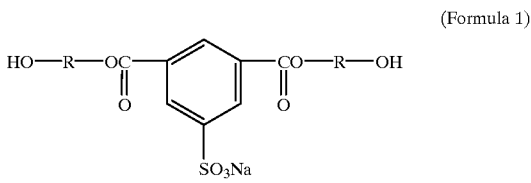

(Formula 1)

where R represents a polyalkyleneglycol residual group, wherein said diamine contains a cyclohexane ring represented by the following formula (3):

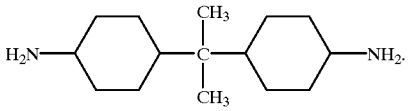

(Formula 3)

4. A magnetic recording medium, comprising a magnetic layer containing ferromagnetic powder dispersed by a binder, the magnetic layer being located on a non-magnetic support member, wherein said binder comprises a polyurethane urea resin prepared by reacting a long chain diol having a weight average molecular weight of 800 to 5,000, a diamine, and an organic diisocyanate, wherein said long chain diol is present in said polyurethane urea resin in an amount of 1 to 5 mol % and is represented by the following formula (1):

| | Poly-urethane Poly-urethane urea | Glossi-ness | Ra (nm) | Electro-magnetic transfer character-istics | Still dura-bil-ity (min) | Storage adhesion |
|---|---|---|---|---|---|---|
| Comparative Example 11 | G | 117 | 2.7 | +0.7 | 30 | Not found |
| Comparative Example 12 | G | 117 | 2.6 | +0.7 | 30 | Not found |

TABLE 2-continued

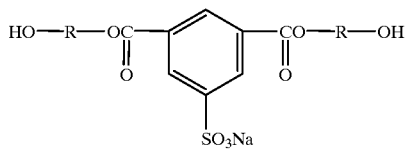

(Formula 1)

where R represents a polyalkyleneglycol residual group, further comprising a non-magnetic layer comprising non-magnetic powder dispersed in a binder, the magnetic layer being located on the non-magnetic layer, wherein said diamine contains a cyclohexane ring represented by the following formula (3):

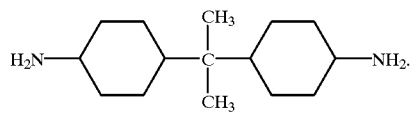

(Formula 3)

5. A magnetic recording medium, comprising a magnetic layer containing ferromagnetic powder dispersed by a binder, the magnetic layer being located on a non-magnetic support member, wherein said binder comprises a polyurethane urea resin prepared by reacting a long chain diol having a weight average molecular weight of 800 to 5,000, a diamine, and an organic diisocyanate, wherein said long chain diol is present in said polyurethane urea resin in an amount of 1 to 5 mol % and is represented by the following formula (1):

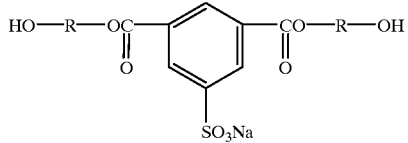

(Formula 1)

where R represents a polyalkyleneglycol residual group, further comprising a short chain diol having a weight average molecular weight of 50 to 500, wherein said short chain diol contains a cyclohexane ring represented by the following formula (2):

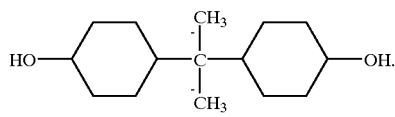

(Formula 2)

6. A magnetic recording medium, comprising a magnetic layer containing ferromagnetic powder dispersed by a binder, the magnetic layer being located on a non-magnetic support member, wherein said binder comprises a polyurethane urea resin prepared by reacting a long chain diol having a weight average molecular weight of 800 to 5,000, a diamine, and an organic diisocyanate, wherein said long chain diol is present in said polyurethane urea resin in an amount of 1 to 5 mol % and is represented by the following formula (1):

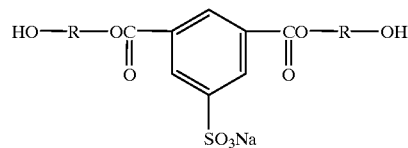

(Formula 1)

where R represents a polyalkyleneglycol residual group, further comprising a short chain diol having a weight average molecular weight of 50 to 500, wherein said diamine contains a cyclohexane ring represented by the following formula (3)

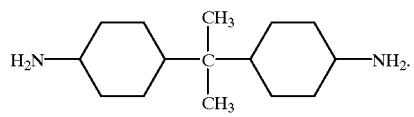

(Formula 3)

7. A magnetic recording medium, comprising a magnetic layer containing ferromagnetic powder dispersed by a binder, the magnetic layer being located on a non-magnetic support member, wherein said binder comprises a polyurethane urea resin prepared by reacting a long chain diol having a weight average molecular weight of 800 to 5,000, a diamine, and an organic diisocyanate, wherein said long chain diol is present in said polyurethane urea resin in an amount of 1 to 5 mol % and is represented by the following formula (1):

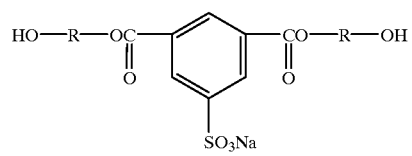

(Formula 1)

where R represents a polyalkyleneglycol residual group, further comprising a short chain diol having a weight average molecular weight of 50 to 500, and further comprising a non-magnetic layer comprising non-magnetic powder dispersed in a binder, the magnetic layer being located on the non-magnetic layer, wherein said short chain diol contains a cyclohexane ring represented by the following formula (2):

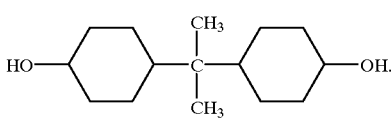

(Formula 2)

8. A magnetic recording medium, comprising a magnetic layer containing ferromagnetic powder dispersed by a binder, the magnetic layer being located on a non-magnetic support member, wherein said binder comprises a polyurethane urea resin prepared by reacting a long chain diol having a weight average molecular weight of 800 to 5,000, a diamine, and an organic diisocyanate, wherein said long chain diol is present in said polyurethane urea resin in an amount of 1 to 5 mol % and is represented by the following formula (1):

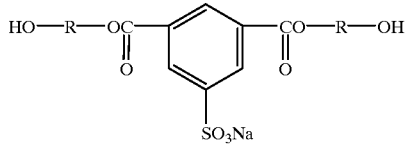

(Formula 1)

where R represents a polyalkyleneglycol residual group, further comprising a short chain diol having a weight average molecular weight of 50 to 500, and further comprising a non-magnetic layer comprising non-magnetic powder dispersed in a binder, the magnetic layer being located on the non-magnetic layer, wherein said diamine contains a cyclohexane ring represented by the following formula (3):

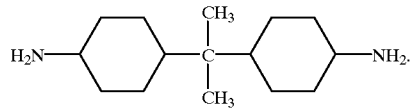

(Formula 3)

* * * * *